United States Patent [19]

Nicoletis

[11] Patent Number: 5,372,038
[45] Date of Patent: Dec. 13, 1994

[54] PROBE TO SPECIFICALLY DETERMINE THE INJECTIVITY OR PRODUCTIVITY OF A PETROLEUM WELL AND MEASURING METHOD IMPLEMENTING SAID PROBE

[75] Inventor: Serge Nicoletis, Rueil-Malmaison, France

[73] Assignee: Sociét Francaise de Stockage Géologigue - Geostock, Rueil-Malmaison Cedex, France

[21] Appl. No.: 140,888

[22] Filed: Oct. 25, 1993

Related U.S. Application Data

[63] Continuation of Ser. No. 855,085, Mar. 20, 1992, abandoned.

[30] Foreign Application Priority Data

Mar. 20, 1991 [FR] France .............................. 91 03396

[51] Int. Cl.$^5$ .............................................. E21B 47/00
[52] U.S. Cl. ........................................ 73/155; 73/153; 166/250
[58] Field of Search .................. 73/151, 153, 155, 587, 73/594; 166/250

[56] References Cited

U.S. PATENT DOCUMENTS

| | | | |
|---|---|---|---|
| 2,757,355 | 4/1956 | Howes et al. | 340/7 |
| 3,817,345 | 6/1974 | Bailey | 73/151 |
| 4,243,099 | 1/1981 | Rodgers, Jr. | 166/250 |
| 4,382,384 | 5/1983 | Mitchell et al. | 73/594 |
| 4,442,895 | 9/1984 | Lagus et al. | 166/250 |
| 4,505,155 | 3/1985 | Jackson | 73/151 |
| 4,732,045 | 3/1988 | Blackburn | 73/587 |
| 4,852,069 | 7/1989 | Clerke et al. | 73/151 |
| 4,918,993 | 4/1990 | Hughson | 73/587 |
| 4,953,398 | 9/1990 | Masson et al. | 73/151 |
| 4,995,014 | 1/1991 | Hoornstra | 367/153 |
| 5,119,089 | 6/1992 | Khalil | 73/151 |

FOREIGN PATENT DOCUMENTS

| | | |
|---|---|---|
| 2564599 | 9/1987 | France . |
| 2226408 | 6/1990 | United Kingdom . |
| 2230091 | 11/1990 | United Kingdom . |

Primary Examiner—Hezron E. Williams
Assistant Examiner—George M. Dombroske
Attorney, Agent, or Firm—Sughrue, Mion, Zinn, Macpeak and Seas

[57] ABSTRACT

Conventional injection tests conducted on petroleum operating wells are effected by measuring the hydraulic characteristic quantities of the fluid injected into the well (mainly pressure, temperature, flowrate). The present invention adds microseismic measurements representative of the acoustic emission induced by injection and employs a probe constituted by a tube combination mainly containing tubular cartridges interconnected by flexible cables with at least some of the cartridges housing means to measure the microseismic quantities representative of the acoustic emission induced by the injection of a fluid into the well. All the cartridges have a sufficiently small diameter so as to be engaged inside tubing disposed in the well. The present invention is also directed to a measurement method using this probe during an injection test including at least one period for injecting the fluid, followed by a no injection period, the tubing of the well including at least one perforation level, wherein the probe is lowered into the well and then is immobilized close to the perforation level so as to measure at least the microseismic quantities, preferably associated with hydraulic quantities, at least during the no injection period. Apart from obtaining a more accurate picture of the injectivity of the well, the present invention thus concerns a test procedure much better adapted to actual requirements (via the modularity of the probe) and one which is much less cumbersome (the probe carrying out several measurements during a single to-and-fro movement in the well).

22 Claims, 1 Drawing Sheet

PROBE TO SPECIFICALLY DETERMINE THE INJECTIVITY OR PRODUCTIVITY OF A PETROLEUM WELL AND MEASURING METHOD IMPLEMENTING SAID PROBE

This is a Continuation of application Ser. No. 07/855,085 filed Mar. 20, 1992, now abandoned.

FIELD OF THE INVENTION

The present invention concerns a probe to specifically determine the injectivity of a well during petroleum exploitation. It also concerns a measurement method implementing said probe.

BACKGROUND OF THE INVENTION

When hydrocarbons are trapped in the cracks and pores of a rock, a method for exploiting the corresponding deposit consists of drilling various wells. Some of these wells are then injected with water or another fluid. This liquid penetrates into the fissures and into the rock matrix and thus pushes back the hydrocarbons towards the remaining wells which are used to recover the petrol.

A test is first conducted on each injection well. This test is primarily designed to ascertain the injectivity of the well and to disclose any possible networks of formation fracturings or natural drains likely to short-circuit the flow routes concerning all the fissures and thus resulting in flooding productive wells.

During a conventional test, a predetermines volume of water is introduced from the surface with a constant or linear flow or by means of gaps. During this time, various measurements are made in the well at each perforation level of a tubing inserted therein. Hydraulic measurements are taken and recorded, such as the pressure and temperature of the injected fluid and the flow at the bottom.

So as to better evaluate the hydraulic characteristics of the subsoil, it is preferable and more effective to record other quantities, known as microseismic quantities. However, up until now, these B5 geothermal energy. These microseismic quantities are representative of the acoustic emission of the terrain when, due to the injection of a fluid, the fissures of the rock open and the terrain changes.

For example, the patent application GB 2 230 091 filed in 1989 by the British Secretariat of State for Energy concerns a probe developed with this aim in mind. It is mainly composed of a measurement cartridge comprising accelerometer type sensors, as well as a control cartridge containing hydraulic, electronic systems, etc., and connected to the measurement cartridge by a flexible cable. One or several hydrophones are also preferably added to the two preceding cartridges so as to form a tool combination (i.e., a combination or series of "tools") suitably adapted for being lowered inside a drilling halo.

Apart from other factors, this probe accomodates the amplitude of seismic waves arriving as far as the drilling at each moment and at several locations. The analysis of these measurements gives an accurate indication at the same location where they are made. In the case of an injection well, it can be readily understood that this knowledge allied to that of the evolution of the hydraulic quantities recorded conventionally would give a clearer picture or the flows developing inside the deposit. The technical problem then posed is how to make available a probe able to simultaneously record the hydraulic and microseismic quantities in an injection well.

SUMMARY OF THE INVENTION

The solution offered by the invention consists of a probe for specifically determining the injectivity of a well during petroleum exploitation, the probe being constituted by a tool combination of mainly tubular cartridges interconnected by flexible cables, at least some of said cartridges housing means for measuring microseismic quantities representative of the acoustic emission accompanying the injection of a fluid into the well, wherein at least one cartridge of the tool combination, apart from those accomodating the means to measure the microseismic quantities, houses means to measure the characteristic hydraulic quantities of the injected fluid.

Indeed, it is possible to re-assemble inside a given tubular cartridge the entire instrumentation required for measuring the hydraulic quantity. This also applies, for example, to the flowrate which can be recorded by a helical flowmeter. This cartridge may also include a pressure sensor and a thermometer. If it is connected to the other cartridges by means of flexible cables, its presence does not adversely affect the functioning of those cartridges carrying out the microseismic measurements. These cartridges in fact can be adjusted in weight to facilitate achieving the desired resonance frequencies, first with respect to the instrumentation, and second with respect to the acoustic emission.

Advantageously, all the cartridges have a sufficiently small diameter so as to be engaged inside tubing disposed in the wall. This generally corresponds to a small size since the tubing in the injection well may be reduced to only 1 11/16" (namely about 42.8 mm). The disposition of the cartridges nevertheless makes it possible to obtain this characteristic. In fact, at a comparable volume, it is possible to reduce the diameter of a cartridge by elongating it. However, it remains more maneuverable than a probe comprising all the sensors and which, under the circumstances, would be excessively long (without mentioning the problems of obtaining resonance frequencies adapted to the nature of the microseismic quantity sensors).

For example, one of said microseismic quantities the speed of the movement of the rock particles as measured by a geophone. It is advantageous for the measuring device to further include pre-amplification electronics. The tool combination preferably comprises a single cartridge housing the geophone, the latter being externally fitted with a foldable arm which contacts the tubing of the well. The geophone may then be able to emit electric signals along one or several channels of the first electric links passing into the flexible cables so as to continuously transmit the signals up to the surface.

One example of the microseismic quantities is the dynamic pressure in the fluid inside the well, as measured by a hydrophone. It is also equally advantageous that the device for measuring the dynamic pressure include pre-amplification electronics. The tool combination preferably comprises a set of at least two cartridges, each housing one hydrophone and placed in the tool combination above or below the cartridge housing the geophone. Each hydrophone is then able to emit an electric signal second electric links passing into the flexible cables so as to continuously transmit the signals up to the surface.

Advantageously, one particular cartridge of the tool combination is a control unit fitted with means for solidly fixing the unit to the tubing so as immobilize the probe in the well. The solid fixing means of the control unit may be, for example, a foldable arm. The cartridge forming the control unit preferably placed in the tool combination directly above the cartridges housing the means to measure the microseismic quantities and includes at its upper portion a connection head for being suspended from a cable.

The characteristic hydraulic quantities of the fluid injected are its pressure, temperature and flowrate. The cartridge housing the means to measure the hydraulic quantities is preferably placed inside the tool combination below the cartridges housing the means to measure the miocroseismic quantities and at its lower portion comprises a protection cone should the tool combination be dropped in the tubing.

Finally, the flexible cables may have a variable length selected as being between several tens of centimeters and several tens of meters. In fact, they may be exchanged so as to adapt their length. Thus, an optimum mechanical uncoupling of the various measuring means is ensured. This also makes it possible to vary the rock volume subjected to seismic monitoring. At the same time, additional cartridges may be added to the tool combination (with new hydrophones, for example), whereas those originally provided may be spaced apart (such as the cartridge(s) housing the means to measure the characteristic hydraulic quantities of the injected fluid). In other words, by virtue of its modular aspect, this probe demonstrates the flexibility required for optimal explanation.

It is now possible to implement this probe systematically on each injection well. As part of an injection test including at least one period for injecting the fluid followed by a no-injection period, the tubing of the well including at least one perforation level, the present invention concerns a method characterized in that the probe is lowered into the well and then immobilized close to the perforation level so as to measure at least the microseismic quantities, at least during the no-injection period.

Although this concerns a more sophisticated and thus more expensive procedure, the spatial marking of the source of acoustic emissions for each well makes it possible to accurately determine the location of the fissure network(s), namely the sites of the main flows. This result, which is able to provide better exploitation of the deposit, could justify any excessive expenditure.

In actual fact, this result is partly counter-balanced by the reduction of the maneuvers to be made. Since this probe measures both the hydraulic quantities and the microseismic quantities, the probe need only be lowered and raised once certain wells reserved for prospection in turn received flowmeter type instruments and then probes, as mentioned in the British application mentioned earlier. These wells should moreover have a wider diameter.

In order to do this, the probe may be lowered into the well when it is suspended from a cable, the cable being wound at the surface onto a drum. The cable may then traverse a well head sealed by means of a hydraulic stuffing box. Advantageously, it contains electric conductive wires so as to transmit the measurements made by the probe to a surface recording installation, at least one portion of the measurements being thus recorded continuously. Any remaining measurements may be sampled so as to be transmitted to the recording installation by means of a single pair of said conductive wires.

Before being lowered, the probe advantageously receives flexible cables whose length is adapted in particular according to the massive volume around the well to be explored by the probe. Again, before being lowered, it may also receive at least one cartridge housing means to measure the hydraulic quantities and, after being lowered into the well, it is rendered immobile at the perforation levels so as to also measure the hydraulic quantities in the fluid inside the well during the injection period and during the no-injection period.

BRIEF DESCRIPTION OF THE DRAWINGS

The present invention will now to be described in more detail with the aid of one preferred embodiment of the corresponding probe and with reference to the accompanying drawings in which.

DETAILED DESCRIPTION OF THE PREFERRED EMBODIMENTS

Figures 1, 2:
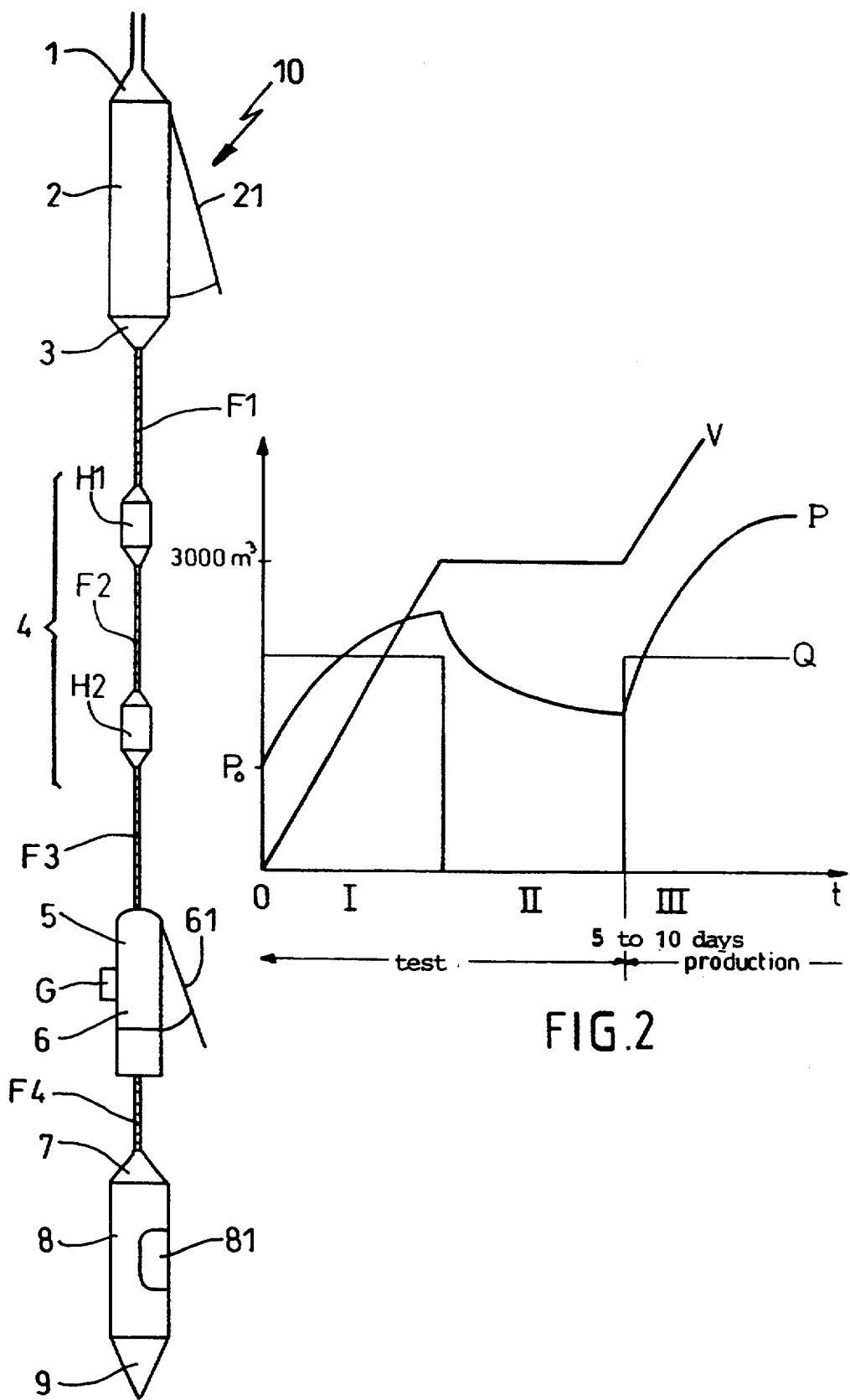
FIG. 1 is a diagrammatic side view of a probe according to the invention.
FIG. 2 is a diagram roughly indicating the time-evolution of the hydraulic quantities in an injection well.

FIG. 1 illustrates how a probe conforming to the invention may be embodied. It preferably appears in the form of a tool combination 10 with cartridges, mainly tubular and interconnected end to end by means or flexible cables Fi. One characteristic feature of the invention is that the diameter of the various cartridges is preferably smaller than the internal diameter of the tubing used in injections wells for petroleum exploitation. More specifically, this internal diameter is at least 1 11/16" (namely about 42.8 mm) and the spatial requirement of the cartridges is smaller than this figure so as to be able to be introduced inside the tubing and to circulate freely inside it.

On the other hand, as for the length of the probe, there are no fixed rules. The cartridges may be of variable length but this also applies for the flexible cables F1. In fact, these cables are intended to mechanically uncouple the various devices of the probe. For example, they prevent any vibrations being transmitted from one cartridge to another. Depending on the case involved, it is thus advantageous to elongate one flexible cable Fi rather than another one. By causing the length of the flexible cables Fi and thus the distance separating the cartridges to vary, the massive volume around the well exploited by the probe is also modified, as well as the investigation depth of the method. This is why this probe is provided with a set of interchangeable flexible cables Fi whose respective lengths might be 1 m, 3 m, 10 m and 20 m, for example. The entire height of the tool combination 10 is accordingly likely to vary from about one meter to about ten meters.

At one extremity, the tool combination 10 forming this probe comprises a connection head 1 for the fixing of a cable (not shown). This cable thus makes it possible to suspend the probe inside the with the head 1 at the top, and to have the probe move between the surface and the bottom of the well. At the other extremity, the bucket chain 10 is preferably provided with a cone 9 for protecting the probe in the event of it falling.

In the example shown in FIG. 1, starting from the top of the probe, there is provided:

one electric control unit 2. It is able to receive signals transmitted from the surface so that the various cartridges execute the corresponding orders. It also includes fixing means for fixing the position of the tool combination with respect to the tubing. In order to do this, an arm 21, advantageously borne directly by the housing of the unit 2, is folded back, for example. The entire weight of the bucket chain 10 may be taken up provided the cable is fully discharged. Of course, the arm 21 is provided so as to be folded back, especially when the probe is lifted up;

a set of cartridges 4 each containing a hydrophone Hi. These are transducers which measure the pressure variations of the fluid occuring in the well (dynamic pressure). They are compensated so as to function with high hydrostatic pressure and temperature values appearing at the depths used in a petroleum application. From this point of view, 300 bars and 150° C. seem to be minimum figures.

The example of FIG. 1 shows two of these, namely H1 and H2, but there could be more (three in particular). It is moreover advantageous to provide electronics 3 for pre-amplifying their signals. The gain is then preferably a minimum of 48 dB and is possibly programmable. The electronic cards required (generally, one per hydrophone) are, for example, housed in the lower portion of the control unit 2 it being understood that the flexible cables Fi internally comprise the electric links required for transmission of the signals derived from each of the hydrophones.

a cartridge 6 comprising a geophone G. This geophone is actually a velocimeter. When it is placed sufficiently close to the host rock of the petroleum deposit, it measures the speed of the movement of the particles forming this rock. This speed, referred to as the displacement speed and similar to the dynamic pressure measured by the hydrophones, is a microseismic quantity representative of the acoustic emission induced by injection.

So as to properly apply the geophone G to the wall of the well, it is advantageous to provide the cartridge 6 with a foldable arm 61 making it possible to solidly fix it to the wall of the pipe column. This arm 61 is preferably activated by an electric motor. It follows that when functioning, the probe is rigidly linked to the terrain at least two points (the level of the control unit 2 by the arm 21 and at the level of the cartridge 6 by the arm 61). The presence of the flexible cables F1, F2 and F3 of the units 4 then avoids any appearance of torsional stresses which would in particular falsify the measurements of the geophone G.

In one preferred embodiment, the geophone G has three channels. The signals of each channel should preferably be pre-amplified at the bottom, like those of the hydrophones. An electronic device 5 may accordingly be integrated with the cartridge 6.

a hydraulic measurement cartridge 8. These hydraulic measurements relate advantageously To the pressure of the fluid occuring in the well (static pressure), its temperature and its flowrate. However, under the present invention, it is still possible to only make one of these measurements. Whatever measurement it may be, the cartridge 8, which receives the corresponding measuring devices (pressure sensor, thermometer or flowmeter 81 or in particular a helix flowmeter), is preferably placed at the bottom of the probe so as to be able to be positioned at the deepest perforations of the tubing.

In one embodiment variant, this cartridge 8 may also include a conventional ray emitting measuring device for determining the depth of the probe in association with the result of the various measurements.

The probe described above appears in its complete form, which thus provides devices for measuring microseismic and hydraulic quantities. Within the context of the present invention, a modular use is nevertheless envisaged, any number of cartridges referred to earlier then being absent from the tool combination 10. This in particular is applicable for the last hydraulic measuring cartridge 8 which may also be used as part of a thus more conventional exploitation campaign. Its compatibility with the microseismic measuring devices and its multifunction aspect nevertheless render it different from those conventionally used probes.

The cable (Fi) mentioned at the outset serves to mechanically and electrically link the various measuring devices. Thus, the various measuring devices are suspended by the cable and are able to transmit their respective signals to a surface recording installation. Conventionally speaking, it is preferable to provide seven conductive wires per cable. Five of these are then reserved for the microseismic measurements: one per hydrophone and three for a three-channel geophone. The remaining conductors may be used to transmit the hydraulic measurements (pressure, temperature and flowrate): These are then preferably sampled, for example every two seconds, the sampled values of each quantity being "raised" in turn by a single pair of conductive wires. However, many other telemetric solutions are possible under the present invention.

The cable traverses the well head, which is closed, preferably by means of a hydraulic stuffing box. This box is provided so as to resist excess pressures possibly reaching at least 100 bars. So as to best guarantee imperviousness at the packer, a smooth cable is preferably used and may be wound onto a drum.

As for the recording installation, it is preferably digital and comprises signal detection, safeguard and interpretation devices.

Thus, by activating the drum, the probe described above may be lowered into the tubing of the injection well so as to pick up the various measurements during the preliminary test of the well. This test generally consists of at least one injection cycle followed by a "rest" or no injection period. The details of this cycle which in all lasts between five and ten days, are shown in the diagram of FIG. 2. They thus correspond to a first period 1 during which the water in particular is injected at a constant flowrate Q on the surface up to an overall volume V equal, for example, to 3000 m3. The pressure P in the well then increases from the hydrostatic pressure Po corresponding to the depth of the measurement. Injection is then stopped (the flowrate Q falling back to 0) and the pressure P in the well is observed to fall off continuously. This period II is known as the "fall-off" period. After this cycle, injection for actually exploiting the site starts, unless another test cycle is deemed necessary (period III).

This probe is used in different ways depending on whether it is being used in the injection period I or in the "fall-off" period II of the test cycle. In the first case, the probe is made to circulate in the well suspended from its cable by activating the drum. Its hydraulic measuring cartridge 8 is in turn positioned at various perforation levels of the tubing so that the helix of the flowmeter 81 is fully driven by the corresponding flows. The cartridge 8 subsequently delivers the pressure and the temperature of the injected water at the same time.

In the case of period II, the probe remains solidly secured to the well by virtue of the arm 21 so that the cable is no longer taut. It is at this time that most of the microseismic quantities are recovered. In fact, they are no longer disturbed by the large flow established in the injection period I. This period lasts for several days, the probe being successively positioned at the right of several tubing perforation levels. The cartridge 8 is still used to measure the associated pressure and temperature.

When restarting injection (period III), flowrate measurements may again be made by means of the cartridge 8, as in period I. By means of these readings made, not merely at the right of each tubing perforation level but also throughout the test cycles, it is currently possible to obtain a relatively accurate picture of the injectivity of the well. In addition to the permeability and state of the wall of the well deduced conventionally from hydraulic quantities, scientific theories have in fact been developed to interpret the measurements jointly supplied by the geophone and the hydrophones (subject to certain hypotheses). Apart from other things, they make it possible to deduce which is the network of fissures of the host rock activated by injection, which plane in this network is the site of the main flows, and by which mechanism they have occured.

It shall be observed that all this information is obtained by using a single probe, indeed relatively sophisticated but according to a cheaper procedure than the one traditionally used. In fact, the probe makes a single movement back-and-forth inside the well, thus avoiding multiplication, with the measurements and maneuvers for placing and extracting monofunctional devices.

The period of one test cycle may for the same reason be reduced so that the well can be serviced ahead of schedule. This saving in time (in terms of is expressed additional days for exploiting the deposit and thus results in achieving increased production. The modularity of the probe made with cartridges and interchangeable flexible cables also allows for optimum adaptation to the envisaged exploitation campaign. Finally, all the injection wells are able to provide a more accurate picture of the hydraulic characteristics of the host rock at their edges. In all, the degree of exploration of the deposit reached is considerably finer than that delivered by conventional test campaigns, which do not generally include extremely accurate measurements authorized by the present probe.

Similarly, this probe is suitable for determining the productivity of a well.

What is claimed is:

1. A probe for specifically determining the magnitude and direction of an injectivity pattern of an injection well by exploring networks of pre-existing cracks and points in a rock matrix during fluid injection in the course of petroleum exploitation, the probe comprising an elongate tool combination having a plurality of tubular cartridges individually housing measuring means, wherein at least some of said cartridges separately house means for measuring microseismic quantities representative of acoustic emissions accompanying the injection of a fluid into the well due to the relative displacement of points in the rock matrix and the fluid movement,,and wherein at least one cartridge of the tool combination, apart from those cartridges housing the means for measuring microseismic quantities, houses means for measuring characteristic hydraulic quantities of the injected fluid, all the cartridges having a diameter not greater than $1\frac{11}{16}$th of an inch so as to be accommodated within standard tubing disposed in the well, and being interconnected in a detachable manner by interchangeable flexible cable elements of variable lengths so as to constitute a modular probe wherein the cartridges and the cable element lengths are chosen in accordance with the measurements to be made.

2. Probe according to claim 1, wherein one of said microseismic quantities is the speed of the movement of the rock particles, the device to measure it comprising a geophone.

3. Probe according to claim 2, wherein the device to measure the speed of the movement of the rock particles further comprises pre-amplification electronics.

4. Probe according to claim 2, wherein the tool combination comprises a single cartridge housing the geophone, the latter being externally provided with a foldable arm for being solidly secured to the tubing of the well.

5. Probe according to claim 4, wherein the arm of the geophone is activated by an electric motor.

6. Probe according to claim 2, wherein the geophone emits electric signals along one or several channels, first electric links passing into the flexible cables so as to continuously transmit the signals up to the surface.

7. Probe according to claim 2, wherein another of said microseismic quantities is the dynamic pressure in the fluid inside the well, the device to measure it comprising a hydrophone.

8. Probe according to claim 7, wherein the device to measure the dynamic pressure in the fluid further comprises pre-amplification electronics.

9. Probe according to claim 7, wherein the tool combination comprises a set of at least two cartridges, each housing one hydrophone and placed in the tool combination above or below the cartridge housing the geophone.

10. Probe according to claim 9, wherein each hydrophone emits an electric signal, second electric links passing into the flexible cables so as to continuously transmit the signals up to the surface.

11. Probe according to claim 1, wherein one particular cartridge of the tool combination forms a control unit provided with means for solidly fixing it to the tubing so as to immobilize the probe in the well.

12. Probe according to claim 11, wherein the solidly fixing means of the control unit consist of a foldable arm.

13. Probe according to claim 11, wherein the cartridge forming the control unit is placed in the tool combination directly above the cartridges housing the means to measure the microseismic quantities and wherein its upper portion comprises a connection head for being suspended from a cable.

14. Probe according to claim 1, wherein the characteristic hydraulic quantities of the injected fluid are its pressure, temperature and/or its flowrate.

15. Probe according to claim 1, wherein at least one of said cartridges housing the means to measure the hydraulic quantities is placed in the tool combination below the cartridges housing the means to measure the microseismic quantities and wherein at its upper portion a protection cone is provided should any fall-off occur.

16. Probe according to claim 1, wherein the flexible cables have a variable length selected as being between several tens of centimeters and several tens of meters.

17. A method for employing a probe to determine the injectivity of a well during fluid injection in the course of petroleum exploitation, the probe comprising a tool combination having tubular cartridges housing measuring means, the cartridges being interconnected by flexible cables, wherein at least some of the cartridges separately house means to measure microseismic quantities representative of the acoustic emission accompanying the injection of a fluid into the well, and wherein at least one cartridge, other than the cartridges housing the means for measuring microseismic quantities, houses means to measure the characteristic hydraulic quantities of the injected fluid, all the cartridges having a diameter not greater than 111/16th of an inch so as to be engaged in tubing disposed in the well, wherein during an injection test comprising at least one period for injecting the fluid followed by one no injection period, the tubing of the well comprising at least one perforation level, the probe is lowered into the well and then immobilized close to the perforation level so as to measure at least the microseismic quantities, at least during the no injection period.

18. Method according to claim 17, wherein the probe is lowered into the well at the start of the injection period and is only lifted up at the end of the injection test.

19. Method according to claim 17, wherein the probe is lowered into the well when it is suspended from a cable, this cable being wound at the surface on a drum.

20. Method according to claim 19, wherein the cable traverses a sealed well head by means of a hydraulic packer.

21. Method according to claim 19, wherein the cable contains electric conductive wires so as to transmit the measurements made by the probe up to a recording installation located on the surface, at least one portion of the measurements thus being recorded continuously.

22. Method according to claim 21, wherein any remaining measurements are sampled so as to be transmitted to the recording installation by a single pair of said conductive wires.

* * * * *